(12) United States Patent
Farrell et al.

(10) Patent No.: US 7,033,122 B2
(45) Date of Patent: *Apr. 25, 2006

(54) FASTENER HAVING IMPROVED PENETRATION CAPABILITY

(75) Inventors: Mark Farrell, Conroe, TX (US); Michael Farrell, Murrieta, CA (US)

(73) Assignee: Evening Star International, Inc., Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/393,878

(22) Filed: Mar. 21, 2003

(65) Prior Publication Data

US 2003/0228203 A1 Dec. 11, 2003

Related U.S. Application Data

(63) Continuation-in-part of application No. 09/724,333, filed on Nov. 28, 2000, now Pat. No. 6,659,700.

(51) Int. Cl.
*F16B 15/00* (2006.01)
(52) U.S. Cl. .................... 411/477; 411/488; 411/463; 411/550
(58) Field of Classification Search ............... 411/477, 411/478, 493, 494, 485, 473, 923, 466, 467, 411/450, 487–489, 462, 463
See application file for complete search history.

(56) References Cited

U.S. PATENT DOCUMENTS

| 403,564 | A | * | 5/1889 | Sullivan | 248/71 |
| 928,630 | A | * | 7/1909 | Conway | 411/477 |
| 1,338,988 | A | | 5/1920 | Kinoshita | |
| 1,425,199 | A | * | 8/1922 | Hartley | 411/457 |
| 1,605,695 | A | * | 11/1926 | Baloyan | 411/477 |
| 1,934,134 | A | | 11/1933 | McChesney | |
| 2,047,012 | A | * | 7/1936 | Domagall | 411/493 |
| 2,155,893 | A | | 4/1939 | Fulton | |
| 2,197,060 | A | * | 4/1940 | Skinner et al. | 411/477 |
| 2,319,058 | A | | 5/1943 | Hansman | |
| 2,382,474 | A | | 8/1945 | Gambo | |
| 2,564,643 | A | | 8/1951 | Hall | |
| 2,740,505 | A | | 4/1956 | Flora | |
| 2,751,052 | A | | 6/1956 | Flora | |
| 2,895,369 | A | * | 7/1959 | Andersen | 411/466 |
| 3,266,362 | A | * | 8/1966 | Carr | 411/466 |
| 3,828,514 | A | * | 8/1974 | Jureit | 403/230 |
| 3,882,755 | A | | 5/1975 | Enstrom | |
| 3,973,295 | A | | 8/1976 | Janke | |
| 3,983,779 | A | | 10/1976 | Dimas | |
| 6,406,241 | B1 | * | 6/2002 | Lorincz | 411/477 |
| 6,866,458 | B1 | * | 3/2005 | Farrell et al. | 411/477 |

* cited by examiner

*Primary Examiner*—Flemming Saether
(74) *Attorney, Agent, or Firm*—Fulbright & Jaworski L.L.P.

(57) ABSTRACT

A metal piercing fastener having an elongated flat body having first and second surfaces with a heat at one end and a piercing point at the other. The thickness dimension of the flat body is greater proximate the head proximate the point. The first and second surfaces of the body are devoid of protrusions extending outwardly therefrom.

6 Claims, 2 Drawing Sheets

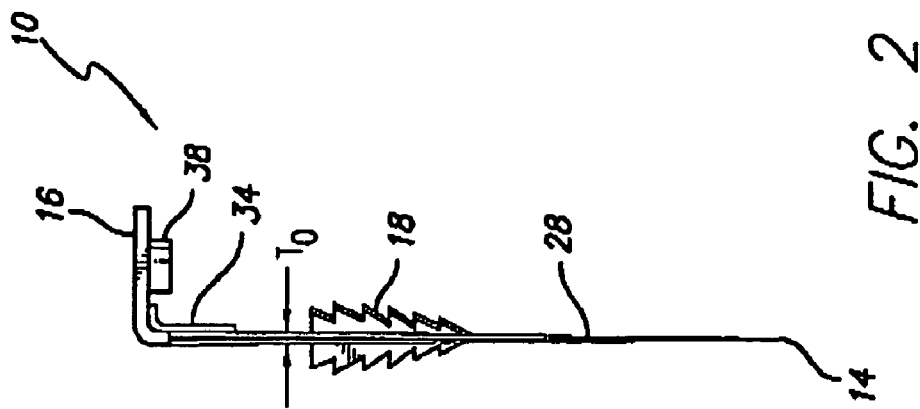
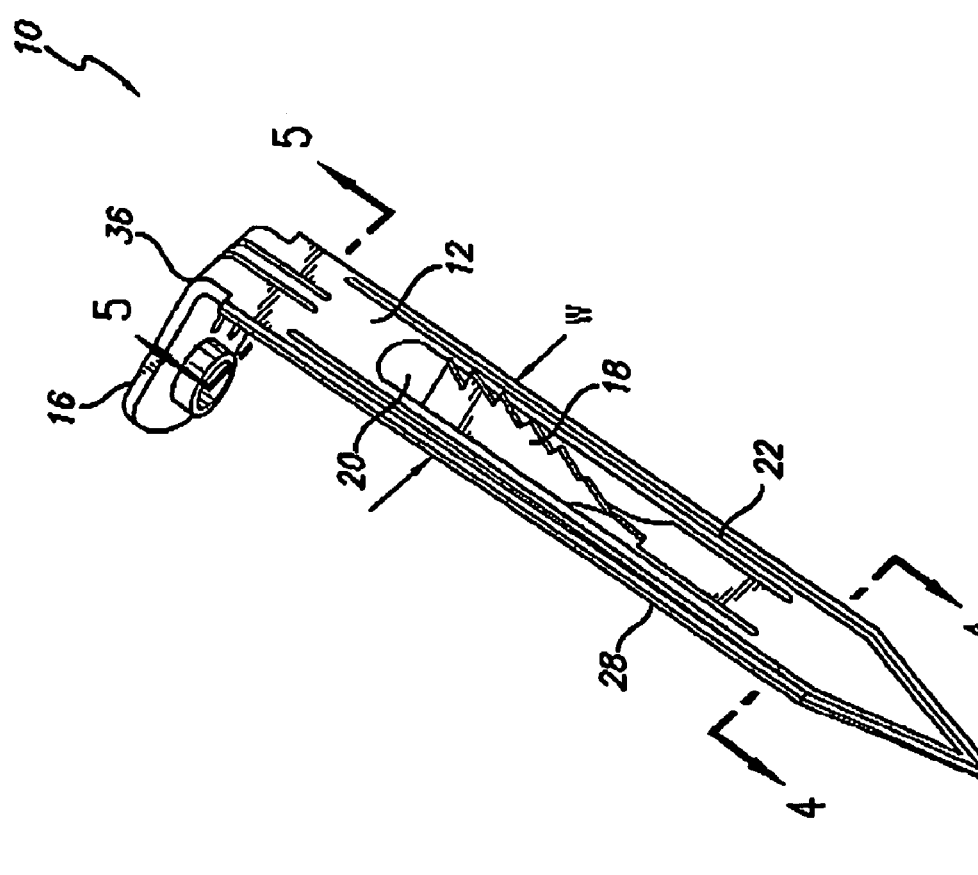

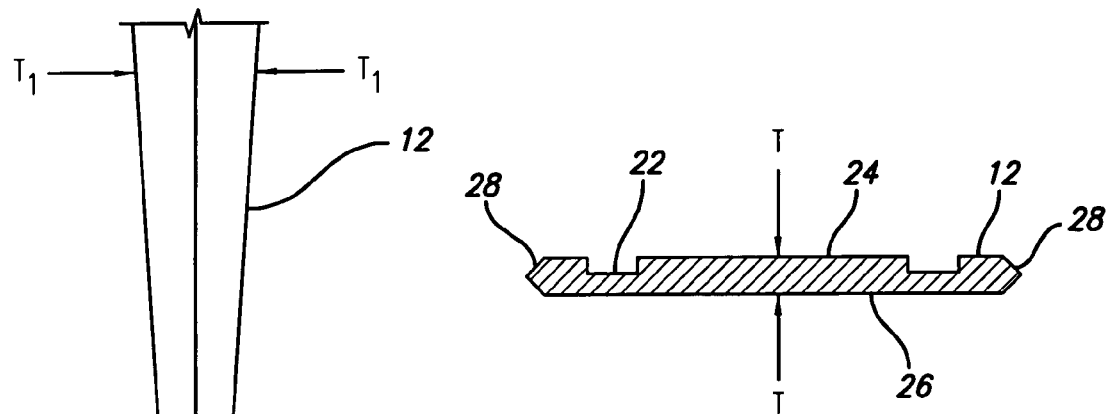
FIG. 3
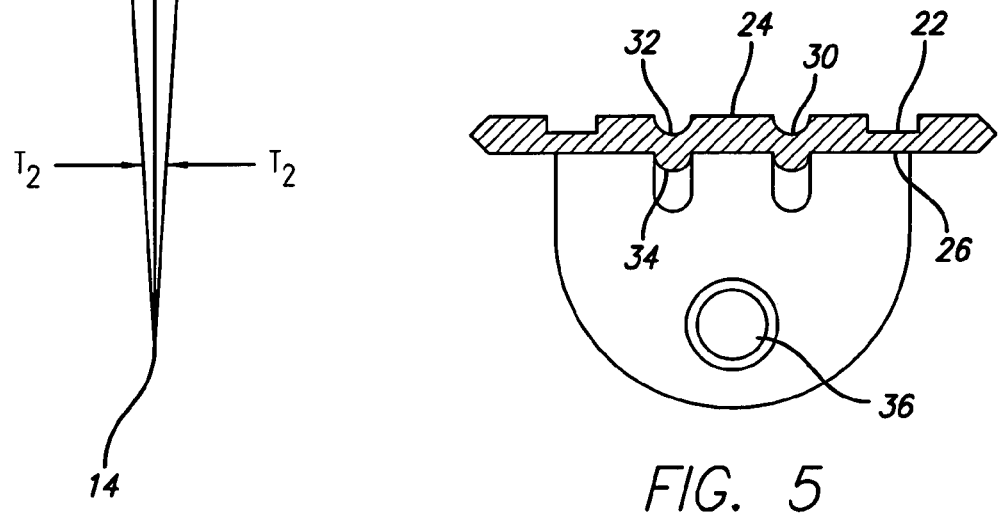
FIG. 4
FIG. 5

FASTENER HAVING IMPROVED PENETRATION CAPABILITY

RELATED APPLICATIONS

This application is a continuation-in-part of U.S. application Ser. No. 09/724,333, which was filed on Nov. 28, 2000, now U.S. Pat. No. 6,659,700 for "METAL PIERCING FASTENER" by the Applicants of this application and is assigned to the same Assignee.

FIELD OF THE INVENTION

The present invention relates generally to fasteners and more particularly to a metal piercing fastener for securing one or more metal/non-metal layers to at least one metal layer and retaining the secured layers in their positions permanently under adverse conditions.

BACKGROUND OF THE INVENTION

Fastener designs for securing work pieces together, such as, for example, a top laminate non metal work piece to a bottom light-gauge metal substrate (18 gauge and thinner) or alternatively, a light-gauge metal work piece to light-gauge metal substrate have generally been accomplished by threaded fasteners. The helical design of the thread has been successful in pulling the top laminate materials together tightly with the light-gauge metal substrate. Additionally, the helical thread design has provided sufficient withdrawal resistance to achieve performance values acceptable to industry. However, installation of helical threaded fasteners has proven time-consuming and fatiguing to the installer. The industries using these light-gauge metals require a fastener that has the speed of pneumatic nailing system with the gripping and clamping features of helical-thread fasteners.

Nail-like products (hardened pins) have been used successfully in attaching work pieces (including top metals) to heavier gauge metal substrates (16 gauge and thicker). However, when the metal substrate is of light-gauge metal (18 gauge and thinner) or two or more pieces of light-gauge metal (18 gauge and thinner) are to be joined together, the substrate may be pushed away (deflection) from the top piece before the penetration and fastening process is completed. Additionally, the thinness of these metals is such that is creates situations where there is insufficient material to provide a friction-lock for current state-of-the-art pins. Whether they incorporate barbs, protrusions, undercuts, cross-hatching or spiral threads, these hardened pins lack withdrawal resistance when installed in these light-gauge materials. Additionally, they lack the ability to pull the substrate and the work piece together to close the gap between them caused by the deflection when the metal substrate is of light-gauge metal.

L. H. Flora (U.S. Pat. No. 2,740,505 and U.S. Pat. No. 2,751,052), discloses a one-piece, spring steel roofing nail for attaching insulation to a sheet metal deck. This roofing nail incorporates a center tongue within a cutout of the body, a point piercing the light-gauge metal deck, and a head, bent in an angle from the same material as the body, used for clamping of the insulation layer. The body includes elongate ribs which are incorporated to stiffen and ridgify the body. In Dimas (U.S. Pat. No. 3,983,779), such ribs are also incorporated but are formed in a more arcuate manner than an acute bend. McChesney (U.S. Pat. No. 1,934,134) also discloses a fastener in the form of a tack for holding two pieces of wood together. This tack is formed from a continuous strip of flat wire which is swaged on both side edges to form converging side flanges which provide a wedge shaped appearance to the width dimension of the web between the side flanges. The provision of such ribs or side flanges dramatically increases driving forces necessary for installation of the nail. In the low-density laminate (insulation) for which both Flora and Dimas have developed their roofing nail and wood for which McChesney developed his tack driving resistance may not be a problem. However, when denser laminates (i.e., gypsum board, plywood, oriented-strand board, cement board) are being fastened to a metal substrate, driving forces encountered are of such nature as to possibly cause incomplete installation. When a commercial pneumatic tool is used for power installation, these added driving forces are enough to "stall-out" the tool. In accordance with the principles of the present invention, for successful fastener installation using a commercial power tool through work pieces of denser material than insulation, the fastener body should be of a design having minimal driving resistance. As a result stiffening ribs or any other protrusions from the plane of the body should be avoided.

It has also been discovered that power installation of a fastener can exceed the driving forces available from the power tool if the maximum thickness of the body is engaged at the beginning of the penetrating point. Therefore, a gradual increase of the body thickness is required from the point up to some substantial area of the body where maximum body thickness is achieved. This "wedge" shape in the thickness dimension allows a progressive opening of the depth of the pierced hole, thereby allowing driving forces to remain within the power curve of a power installation tool. However, the "wedge" shape of the body with material removed to create a void for a tine (as in the design of the present invention) would create a body too weak to withstand driving forces required for installation. Therefore, corresponding stamped depressions (coining) running the majority of the length of the body are required for additional body strength. These strengthening characteristics must all be recessed below the main body surface as not to cause driving resistance such as encountered with the prior art side stiffeners. Any protuberance beyond the surface of the body, except for the tine, acts as driving resistance and can adversely affect proper installation.

Additionally, it has been found that a continuous beveling of the side edges of the body including the penetrating point side edges is a major aid in reducing driving forces. Also, the V shaped point having beveled side edges has been found to be beneficial in penetration.

SUMMARY OF THE INVENTION

A fastener for securing a work piece to a metal substrate includes an elongated flat body having a point for penetrating the work piece and the substrate and has a width and thickness dimension and an outer edge. A securing member is carried by the body, A head is disposed at one end of the body for driving the fastener through the work piece and the substrate. The thickness dimension of the body is greater proximate the head than proximate the point.

BRIEF DESCRIPTION OF THE DRAWINGS

FIG. 1 is a perspective view of a fastener constructed in accordance with the present invention;

FIG. 2 is a side elevational view of the fastener illustrated in FIG. 1;

FIG. 3 is an enlarged fragmentary side view of the body of the fastener illustrating a variation in the thickness dimension thereof;

FIG. 4 is a cross-sectional view of the body of the fastener of the present invention taken about the lines 4—4 of FIG. 1; and FIG. 5 is a partial cross-sectional view of the body of the fastener illustrated in FIG. 1 taken about the lines 5—5 thereof.

DETAILED DESCRIPTION

A fastener constructed in accordance with the present invention eliminates substantially all protrusions from that portion of the body of the fastener which penetrates the metallic substrate to thus minimize the friction involved as the fastener penetrates the metallic substrate. In addition, the thickness dimension of the body of the fastener is formed to have a "wedge" profile with the thinnest part of the wedge nearest the penetrating point. Such a profile reduces the initial forces required to form the aperture in the metal substrate which in turn, allows the forces generated by the power tool to provide sufficient velocity to drive the fastener through the work piece and through the metal substrate to a position such that the substrate and the work piece can be clamped together.

These and other features of the fasteners in accordance with the present invention are illustrated in the drawings to which reference is hereby made. As is shown, in FIG. 1, the fastener 10 includes an elongated body 12 having a point 14 for penetrating the work piece and the metal substrate. Provided at the opposite end of the elongated body 12 is a head 16 adapted for engagement by a power tool (not shown) to drive the fastener 10 through the work piece and the metal substrate. A securing member 18 is carried by the body 12 for securing the work piece and the metallic substrate together after insertion. The securing member 18 as illustrated in FIG. 1 is a tine which is disposed within an opening 20 formed in the body 12. The tine extends from the lower portion of the opening and protrudes upwardly into it. As is shown in FIG. 1, the tine is deformed along its longitudinal axis (twisted) and as it passes through the aperture formed by the point 14 it flattens into the opening 20 and does not distort the aperture dimensions. The securing member then by friction from the edges locking within the formed aperture holds the work piece and the metal substrate together. The fastener 10 has a width dimension W and a thickness dimension T (FIG. 2).

As is seen more clearly in FIG. 3, to which reference is hereby made, the body 12 thickness dimension is greater near the head 16 that it is near the point 14. That is, the dimension may have a first thickness T1 proximate the head which then becomes less or is minimized as shown at T2 proximate the point 14. This reduction in thickness again minimizes the driving resistance as the fastener 10 is driven by the power tool through the work piece and the metal substrate. As is illustrated in FIG. 3, preferably the reduction in thickness from T1 to T2 is continuous and is symmetrical although such is not a requirement. That is, a reduction in thickness from T1 to T2 may take place on only one side of the body 12 as opposed to taking place on both sides. Alternatively, the reduction may take place in steps from T1 to T2 if such is desired. It should be understood by those skilled in the art that the illustration provided in FIG. 3 magnifies the reduction in thickness from T1 to T2 for purposes of illustration and ease of understanding the principle involved. For example, the reduction in thickness preferably would be on the order of 0.2 mm over a 3.5 cm length of the body. Although such dimension is at the present time believed to be the most preferred embodiment it should be understood that the thickness dimension reduction may vary depending upon the length of the body, the material involved and the work piece metal substrate into which the fastener is being inserted. The reduction in thickness of the body is accomplished by subjecting the body to extreme pressure during the stamping operation which forms the fastener. Thus, the amount of reduction and profile thereof is controlled by the shape of the stamping dies.

As is illustrated in FIG. 4 the body 12 may be coined along the edges as shown at 22. The term coined or coining means that the thickness of the metal of the body along the edges is reduced by the application of extreme pressure. The coining generates a depression or channel which extends from adjacent the head 16 down both side edges of the body to and including the point 14 but displaced slightly from the side edges. Thus, coining as used in this application is intended to mean that the material on the first surface 24 is compressed to form the channels as shown at 22 but in such a way that there is no protrusion of the metal of the body from the second surface 26 thereof. The coining preferably is accomplished during the stamping operation which produces the fastener but may be performed separately, if desired. Such an operation work hardens the material causing it to be able to penetrate through the work piece and substrate easier without bending or otherwise deforming. In addition, as is illustrated in FIG. 4 the side edges of the body 12 are beveled as shown at 28 down through and including the point 14. Such beveling further simplifies and makes it easier for the fastener 10 to penetrate particularly through the metal substrate. It should be understood that the bevel formed on the edges forming the point 14 continues uninterrupted up the side edges of the body 12. Thus, when the point 14 cuts an opening in the metal substrate, it has a bevel shape at its edges into which the side edges of the fastener fit without the necessity of further cutting the substrate. It should be further noted that the first and second surfaces 24 and 26 of the elongated flat body 12 are devoid of protrusions extending outwardly therefrom at least along that part of the fastener body which penetrates the metal substrate.

As is illustrated in FIG. 5, the body adjacent to and including a portion of the head has formed therein first and second stamped stiffening grooves 30 and 32. These grooves overlap the upper portions of the coining channel as illustrated in FIG. 5 which is taken about the lines 5—5 of FIG. 1 although such overlapping is not required. By the term stamped stiffening grooves, it is meant that the material of the body during the stamping operation which forms the body is deformed so that a groove is formed on the surface 24 and a protrusion is formed on the surface 26 as shown at 34. Also as shown in FIGS. 1 and 5 the protrusion 34 continues around the bend 36 which forms the head 16 and onto the head.

As is shown particularly in FIG. 2, there is formed about the opening 37 a downwardly depending flange 38 which is utilized to cut through the surface of the work piece such as drywall to facilitate the head 16 positioning itself flush with the drywall surface without damaging the same.

As is seen from the illustrations and the above description, there are no strengthening protrusions extending from the surface of the body 12 over that portion which penetrates through the metal substrate.

There has thus been disclosed a fastener for securing a work piece to a metal substrate which has minimum penetration resistance through the metal substrate and yet securely adheres the work piece to the substrate.

What is claimed is:

1. A fastener for securing a work piece to a metal substrate with a power tool comprising:
    an elongated body having first and second surfaces and including a point for penetrating said work piece and said substrate and having a width and a thickness dimension defined by said first and second surfaces and an outer edge;
    a securing member carried by said body;
    said first and second surfaces being devoid of protrusions extending outwardly therefrom, at least along that portion thereof between said point and said securing member which penetrates said substrate;
    a head at one end of said body disposed at a substantially right angle to said body for use in driving said fastener through said work piece and said substrate;
    said thickness dimension of said body being greater proximate said head than proximate said point;
    a first stamped stiffening groove disposed at a transition between said body and said head and extending from said transition along said body and said head; and
    said body being coined adjacent to but displaced from said outer edges of said body and said stamped stiffening groove extends along said body for a distance to overlap said coining.

2. A fastener as defined in claim 1 which further includes a second stamped stiffening groove laterally displaced from said first stamped stiffening groove.

3. A fastener as defined in claim 2 wherein said first and second grooves are each disposed substantially equidistance from opposite sides of said outer edge.

4. A metal piercing fastener for securing a work piece to a metal substrate with a power tool comprising:
    an elongated body having first and second surfaces and including a point for penetrating said work piece and said metal substrate and having a width and a thickness dimension defined by said first and second surfaces and an outer edge;
    a securing member carried by said body;
    said first and second surfaces being devoid of protrusions extending outwardly therefrom, at least along that portion thereof between said point and said securing member which penetrates said substrate to form an opening therein to receive said body;
    a head at one end of said body disposed at a substantially right angle to said body for use in driving said fastener through said work piece and said substrate with a power tool;
    a first stamped stiffening groove disposed at a transition between said body and said head and extending from said transition along said body and said head;
    said body being coined adjacent to but displaced from said outer edges of said body and said stamped stiffening groove extends along said body for a distance to overlap said coining; and
    said thickness dimension of said body being greater proximate said head than proximate said point said thickness dimension continuously varying throughout said body to provide a minimized penetrating resistance for said body.

5. A fastener as defined in claim 4 which further includes a second stamped stiffening groove laterally displaced from said first stamped stiffening groove.

6. A fastener as defined in claim 5 wherein said first and second grooves are each disposed substantially equidistance from opposite sides of said outer edge.

* * * * *